United States Patent [19]
Randall

[11] 3,805,852
[45] Apr. 23, 1974

[54] ASSEMBLIES AND METHOD FOR MAKING CABLE BEADS

[75] Inventor: Leslie L. Randall, Akron, Ohio

[73] Assignee: Monsanto Company, St. Louis, Mo.

[22] Filed: Feb. 24, 1972

[21] Appl. No.: 228,988

[52] U.S. Cl. .................... 140/71 R, 57/21, 242/4 C
[51] Int. Cl. ......................... B21f 3/00, B21f 45/00
[58] Field of Search ...... 57/21, 141, 158; 140/71 C, 140/88, 92.2; 152/362 R; 245/1.5; 425/224, 455, DIG. 48; 242/4 B, 4 BE, 4 C, 4 R; 156/136, 422

[56] References Cited
UNITED STATES PATENTS

| | | | |
|---|---|---|---|
| 3,748,841 | 7/1973 | Fraleigh et al. | 57/158 X |
| 1,479,900 | 1/1924 | Dorner et al. | 57/158 X |
| 1,488,614 | 4/1924 | Pratt | 57/21 |
| 1,570,821 | 1/1926 | Beyea | 57/21 |
| 1,935,239 | 11/1933 | Derry | 57/21 X |

*Primary Examiner*—Charles W. Lanham
*Assistant Examiner*—E. M. Combs

[57] ABSTRACT

In making a cable bead or grommet by rotating an annular bead, feeding to it strand from a coiled supply thereof and rotating the coiled supply of strand successively about the bead with respect to an axis passing through its centers of cross sections the angle, which the axis of symmetry of the coiled supply makes with the plane of rotation about the bead, is varied during each rotation to provide a path of the discharge point of strand to the bead shorter than the path of the midpoint of the axis of symmetry of the coiled supply. An improved rotating assembly rotates the annular bead at predetermined substantially constant velocity with respect to the axis passing through the centers of cross section.

9 Claims, 10 Drawing Figures

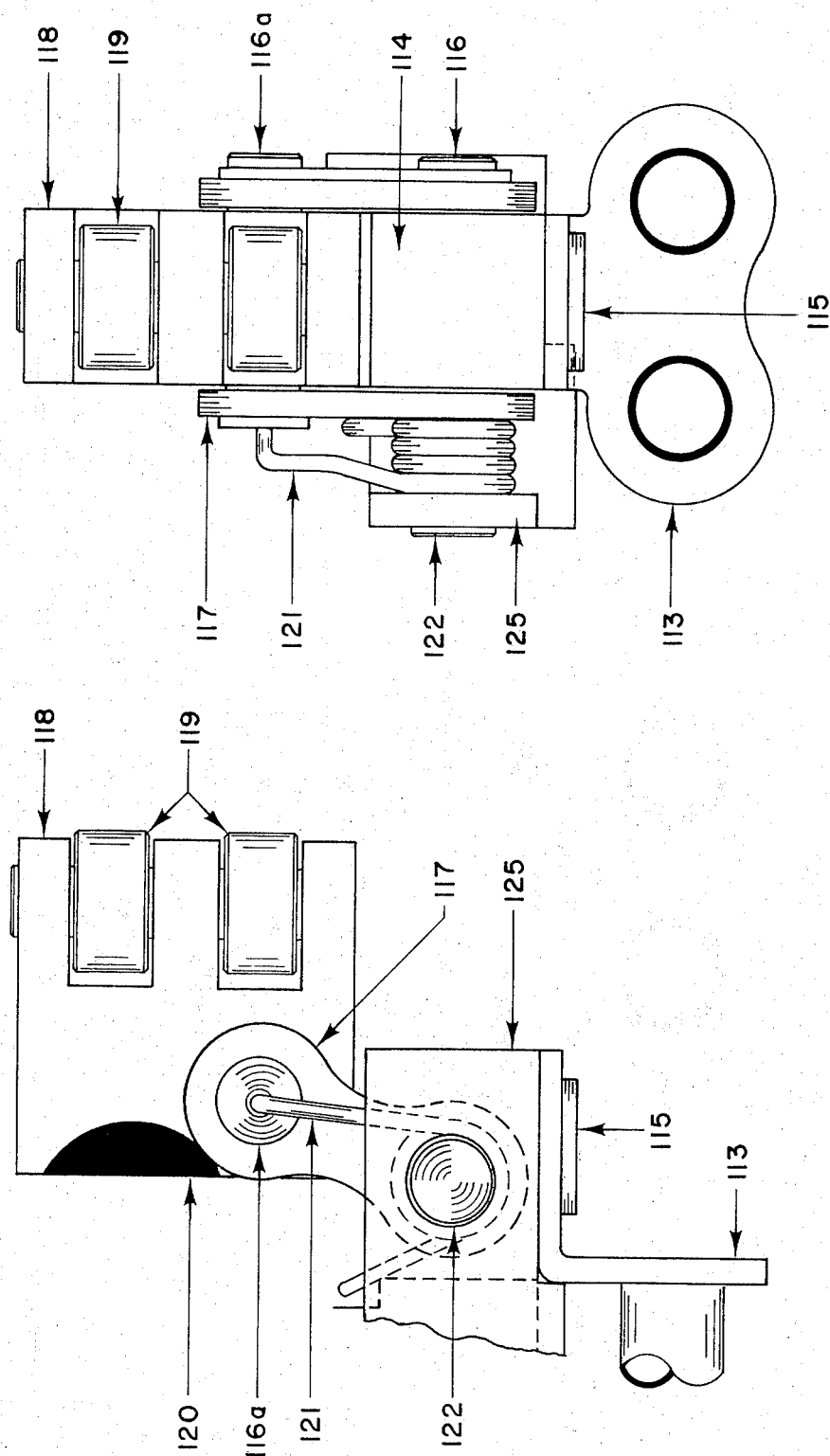

ASSEMBLIES AND METHOD FOR MAKING CABLE BEADS

This invention relates to an apparatus and method for making cable beads or grommets particularly for pneumatic tires.

BACKGROUND OF THE INVENTION

Cable beads or grommets comprising an annular core of wire covered by several spirals or convolutions of strand wire were described early in the art. A characteristic of the type of cable bead wherein the core is independent of the spiral wrap or strand is that imposition of a bursting stress on the cable will cause the convolutions of the spiral to grip the core tightly and the uniform distribution of stress throughout the cable provides great strength. Such beads are especially desirable for radial tires.

Prior methods of making cable beads have taken various forms but generally depart from making beads strictly of the aforesaid type and thereby compromise some of the desirable properties. One method is to use a continuous piece of wire for both the core and strand, the wire being wrapped upon itself under sufficient tension to distort it and bend it to lay tightly on the core. Another method is to subject the strand wire to a precrimping or spiraling operation and then wrap the prespiraled wire without further distortion. Both methods are to an extent self-defeating with respect to achieving maximum gripping action of strand wire upon the core when the bead is subjected to bursting force. In either case, the method of manufacture has comprised storing a supply of strand in coil form, feeding strand to the core while rotating the core and rotating the coiled supply about the core and, if necessary, providing suitable means to avoid twisting of strand.

For the manufacture of cable beads having high gripping action, it has been found desirable to minimize bending distortion of strand in the process of feeding it to the core. The rotation of a coil of metal strand around the core with apparatus heretofore described introduces substantial bending of the strand, especially at points where the supply is furthermost from the plane of the core, although rotation is desirable mechanically. The invention is concerned in part with improvements which retain the conventional rotary motion but minimize bending distortion by further compounding the motion of the coiled strand supply and in part with an improved system for keeping the positions of the coil and core in proper relationship.

SUMMARY OF THE INVENTION

The improvements, according to this invention, relate to a system which includes supporting and rotating an annular core or bead about its axis of symmetry and feeding strand to the core from a coiled supply while rotating the coiled supply of strand successively about the core with respect to an axis passing through its centers of cross section and rotating the coil about its own axis to compensate for the rotation about the core. The improvements comprise varying during each rotation the angle which the axis of symmetry of the coiled supply makes with a plane of rotation about the core so that the discharge points of strand to the core circumscribe in each such rotation a path shorter than the path circumscribed by the midpoint of the axis of symmetry of the coiled supply in the same rotation, and in a preferred embodiment rotating the annular core and ensuing cable bead at predetermined substantially constant velocity with respect to the circumferential axis passing through the centers of cross section of the core by means of an improved bead drive assembly.

It is necessary to provide means to avoid twisting strand as the coiled supply rotates around the core. The usual means provide for rotation of the support for the coiled supply about its own axis to compensate for the rotation of the coil about the core. The direction of rotation of the support for the coil of strand about its own axis will thus be opposite to the direction of rotation of the coiled supply around the core. In rotating a coiled supply of strand around the core, the strand is normally subjected to considerable deformation at the location of discharge from the supply to the core which apparently interferes with the manufacture of satisfactory cable beads. In any event, a remarkable improvement results from tilting the coil of strand with respect to its plane of rotation about the core to diminish the distortion.

The angulation is conveniently accomplished by setting the rotatable support for a reel or canister holding the coiled strand at an angle with respect to a perpendicular to the plane of rotation about the core. More particularly, the support is tilted from the vertical in the direction of a radius of the plane of rotation about the core, the angular support thus becoming conincident with the plane of the core when it passes through the opening in the core. The axis of the coil of strand, usually contained in a reel or canister, conincident or parallel to the angular support is usually a diameter thereof but may be slightly offset. Its axis of symmetry when said diameter is substantially coincident with the plane of symmetry of the core is either perpendicular to said plane or parallel thereto depending upon which side of the plane of rotation the reel or canister is mounted. The plane of rotation may be identified as the plane of rotation of an assembly, slotted to insert and remove the core, which carries the strand supply around the core. Because the angled support also rotates about its own axis of symmetry, it follows that regardless of the orientation in which the coil of strand is fixed to the support, the angle which the axis of symmetry of the coiled strand makes with the plane of rotation will vary during each rotation about the core becuase of the angulation of the support in combination with the two rotations involved. However, a diameter of the coil taken parallel to the plane in which the coil rotates about the annular bead will remain substantially constant. The fixed angle between the perpendicular to the plane of rotation and the angled support will usually be within the range of 15°–60°. The same angle may be defined substantially as the angle formed by a line from a point of discharge of strand from the coil to the midpoint of its axis of symmetry and a line from said point of discharge perpendicular to the plane of rotation of said midpoint about the core.

The points of discharge from the coiled supply of strand to the core in cooperation with the complex motion of the coiled supply define a circular path which is shorter than the circular path of the point on the axis of symmetry of the coil midway between the ends of the cylinder defined by the coil. It will be apparent that a line connecting the aforesaid circular paths circumscribes a truncated cone, but it will be appreciated that the apex of a cone formed by extending said line would not ordinarily fall on the core. By providing for feeding the strand from the coil at the proper angle, the distance of the coil from the core is relatively unimportant, but it may be desirable to provide suitable guides to maintain a segment of strand between the discharge point on the coil and the point of contacting the core at the angle defined by the angled support.

Synchronization of the speed of rotating the annular core and the speed of rotating the coil about the core is necessary to provide for starting each successive wrap at a different position on the core. The core movement must be a little faster or slower than the supply movement depending upon which side of the first wrap the next one is laid but is preferably a little slower so that the core is a little further retarded at the beginning of the next convolution to permit each succeeding convolution of strand wrap to lie ahead of the preceding one. The motion of the supply is therefore synchronized with the rotational motion of the core to achieve the desired contiguous covering, but the strands do not necessarily touch one another throughout their length. Because any error is cumulative with each succeeding strand, the synchronizing error is desirably kept below 1 percent.

The apparatus for applying the aforesaid principles conveniently may include more or less conventional means for supporting and rotating an annular core such as a belt drive, means for storing and supporting a supply of strand in coiled form such as a reel on a rotatable shaft, means for rotating the core with respect to its own axis of support and means for synchronizing the speeds of the supply and core movements. The supply may contain strand sufficient for one or more cable beads, and it is feasible to allow somewhat greater length than required and cut the excess at the end, but is is possible to operate with predetermined lengths of strand and thereby avoid cutting strand after wrapping the core. The length may be calculated from the relationship Length = Circumference multiplied by the times the strand is to be wrapped and multiplied by the secant of the angle of lay with respect to an axis conincident with the plane of the core. A supply of strand in the form of relatively large loops, which may approach the maximum which will go through the opening in the core, would minimize preforming the strand supply, but the shorter the length of strand from the coil to the point where it contacts the core, the greater the angle it subtends during rotation of the coil around the core. HOwever, the afore-described angulation reduces the significance of the size of the coil and diminishes the angle the strand subtends with respect to the core during rotation about the core.

The strand is desirably fed at approximately the angle of lay which is usually small. The objective is substantially achieved by the herein described tilt of the coiled supply and feeding strand at an angle defined by the angled support so as to discharge strand to the core from points on the coil which circumvent a shorter and hence closer path about the core than other parts of the coil, the midpoint of the axis of symmetry being taken at the reference point in the forgoing discussion. If the strand is contained on a wide reel to accommodate a large supply, it may be desirable to insert a guide between the reel and core to confine the strand feed more closely to the angle defined by the reel support.

It will be appreciated that one or several layers of strand may be applied to the core. Each layer of strand is usually wound opposite that of the previous layer. According to the usual convention a 1 + 9 cable indicates a core with a single layer of 9 strands. Thus, a cross section of the cable would comprise a central core surrounded by 9 strands. Similarly, a 1 + 8 + 15 + 20 cable indicates a central core covered by 8 strands and having in addition another layer of 15 strands and finally an outer layer of 20 strands. The core may comprise single or multiple units. The process of manufacture starts with an annular hoop, herein referred to as a core or bead, to which strand is applied to produce the desired cable bead. The core and strand are usually metal and the strand is usually circular in cross section but the method and apparatus are adaptable to wrap material which is flat or ribbon shaped and to materials other than metal. The process will be described for application of single continuous unit of strand to form each layer but similar principles are applicable to feeding more than one unit of strand at a time.

The improved assembly for imparting predetermined, substantially constant velocity to the rotation of the annular bead with respect to the axis passing through the centers of cross section of said bead employs gripping means which exert opposing pressure against the bead with respect to its plane of symmetry. The jaws of the gripping means are held against the side of the bead by spring pressure and are movable not only to release the completed bead and to insert a new core for the next bead, but are movable while under the said spring pressure in order to accommodate the growth of the bead as strand is applied. The diameter of a cross section of the bead parallel to the axis of symmetry is changing due to the layers of strand being applied to the core. Consequently, the inside circumference of the bead is decreasing and the outside circumference is increasing. A roller driving the bead and turning at a constant number of revolutions per second will, therefore, advance the bead by each revolution a different proportion of the circumference than at the beginning of the operation. Moreover, the surface of the bead is uneven during the filling of each layer of strand and the frictional force exerted by the rollers varies and tends to allow slippage.

To apply pressure evenly regardless of surface irregularity, the jaws of each gripper or each pair of grippers may be individually spring loaded with one jaw pressing against one side of the bead and its opposite member pressing against a corresponding area on the other side of the bead. The adjacent pair of jaws being individually spring loaded will accommodate variations of the bead surface around its circumference. However, a simpler construction which accommodates surface variations without individual spring loading of the grippers has the gripper jaws staggered, as hereinafter described, so that the opposing forces are at different or staggered locations on the circumference of the bead. In either case, by driving at the sides of the bead, the effect of the changing circumferences of the annular bead around its axis of symmetry is minimized. A positive drive in which the same area of the bead surface remains in frictional contact with the surface of a gripping jaw throughout the span of contact reliably provides substantially constant velocity of the circumferential axis of the bead through its centers of cross section during the entire formation of the bead regardless of the layers of wrap applied.

DESCRIPTION OF THE DRAWINGS

FIG. 7 is a view of the chain gripper assembly perpendicular to the plane of rotation.

FIG. 8 is a detail of a gripper unit.

DETAILED DESCRIPTION

The device comprises three mechanical assemblies, namely, motor drive assembly, bead holding and rotating assembly, and reel carriage assembly, each of which performs a separate function. The motor drive assembly comprises a gear motor which supplies power through separate gear and power transmission systems to the bead rotating assembly and to the reel carriage assembly. The bead holding and rotating assembly of FIGS. 1 and 2 comprises a series of guides and rubber faced rollers on both the inside and outside diameter of the bead. Rubber faced rollers on the outside of the bead are paired to rubber faced rollers on the inside of the bead, the outside series being mounted on swing arms which are actuated by air cylinders to open and close. The reel carriage assembly comprises a rotating slotted platform with a reel or canister to hold the wrap wire mounted on a pivot shaft and gear box. The rotation of the platform and pivot shaft and the angular disposition of the pivot shaft impart a complex motion to the reel.

Figure 1:
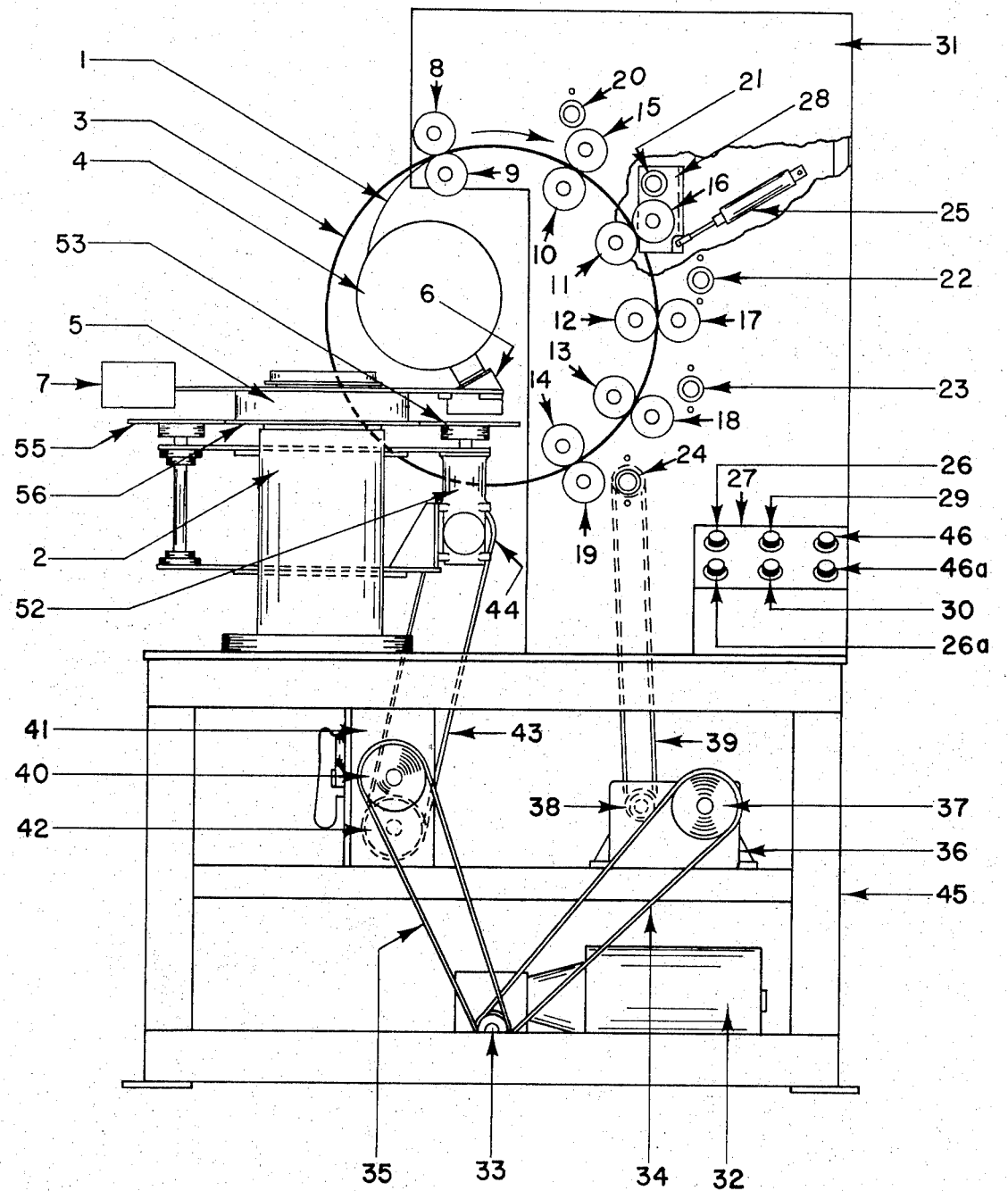
FIG. 1 is an elevation of an apparatus for manufacture of a cable bead viewed perpendicular to the plane of the bead.

In FIG. 1, the apparatus with the core and strand in place is illustrated in its condition at the beginning of the manufacture of a cable bead. An end of the wrap wire or strand 1 is fed to the core 3. To start the operation the end of the wrap wire may be secured to the core by Mylar tape or other suitable means adopted for keeping the end of strand against the core. A supply of strand in coil form is wound on a reel or confined in canister 4 mounted on rotating platform 5 supported on post 2. Opposite the strand supply and its mounting assembly, which includes an angle gear box indicated generally as 6, is counter weight 7. The bead holding and rotating assembly comprises grooved guides 8 and 9 and five pairs of rubber faced idler rollers 10, 11, 12, 13 and 14 on the inside of the bead or core and driven rollers 15, 16, 17, 18 and 19 on the outside of the bead or core. The inside rollers are mounted with their centers in an arc such that their faces form an arc equal to the inside radius of the cable bead to be formed. The outside rollers are mounted on swing arms pivoting around shafts 20, 21, 22, 23, and 24, respectively, the pivot motion being controlled by air cylinders, one of which 25 is visible as part of swing arm assembly in housing 28, to open and close (clamp or release) the cable bead. The control switch 29 for the clamping assembly is located in the operator control panel 27. Upon actuating starting switch 26 in operator control station 27, the core and ensuing bead continuously rotate in the direction of the arrow over the aforesaid rubber faced rollers. A jog switch or button 30 activates the drive only when depressed permitting small adjustments to be made in the position of the bead or core which may be desirable at the beginning and end of the operation. The continuous forward motion is terminated by activating stopping switch 26a. Grooved guides 8 and 9 in conjunction with the rubber faced rollers keep the rotating bead in a vertical plane. Grooved rotary guide 8 is mounted on a swing arm assembly controlled by an air cylinder, not shown, and grooved rotary guide 9 is stationary mounted. The assembly which drives the bead comprising the aforesaid grooved guides, driven rollers, pivot shafts and air cylinders is mounted on a suitable frame or top weldment 31.

The power is supplied by gear motor 32 which drives two sprockets on shaft 33 which in turn drive chains 34 and 35. Chain 34 drives a positive variable speed gear box or transmission 36 by means of sprocket 37 on the gear box. The output of the gear box is transmitted by sprocket 38 via chain 39 to the bead drive assembly. Chain 39 drives a sprocket on shaft 24. A gear, not shown, mounted on the same shaft meshes with a gear on the shaft bearing roller 19 driving it in a counterclockwise direction. Another sprocket, not shown, on shaft 24 drives a chain to a sprocket on shaft 23. An additional sprocket and chain and a gear are mounted on shaft 23. The chain drives shaft 22 by a sprocket mounted thereon, and the gear meshes with a gear on the shaft on which roller 18 is mounted. Similar sprockets, chains, and gears drive the remainder of the shafts and driven rollers. The variable speed gear box serves as a synchronizer by which the ratio of the bead speed to the reel carriage speed can be adjusted as required.

The gear motor 32 also drives the rotating platform 5 on which the reel canister is mounted by aforesaid chain 35 to sprocket 40 of reversing gear box 41. The output of the reversing gear box is transmitted by sprocket 42 and chain 43 to sprocket 44 driving rotating platform 5. Sprocket 44 acting through an angle gear box 52 drives sprocket 53 and chain 54 (FIG. 3) which chain runs over idler sprocket 55 and is thereby held in engagement with sprocket 56 on the platform to be rotated. Thus, both the platform and bead are driven from a single power source located in base weldment 45. The forward and reverse motions of the platform are controlled by forward switch 46 and reversing switch 46a.

Figure 2:
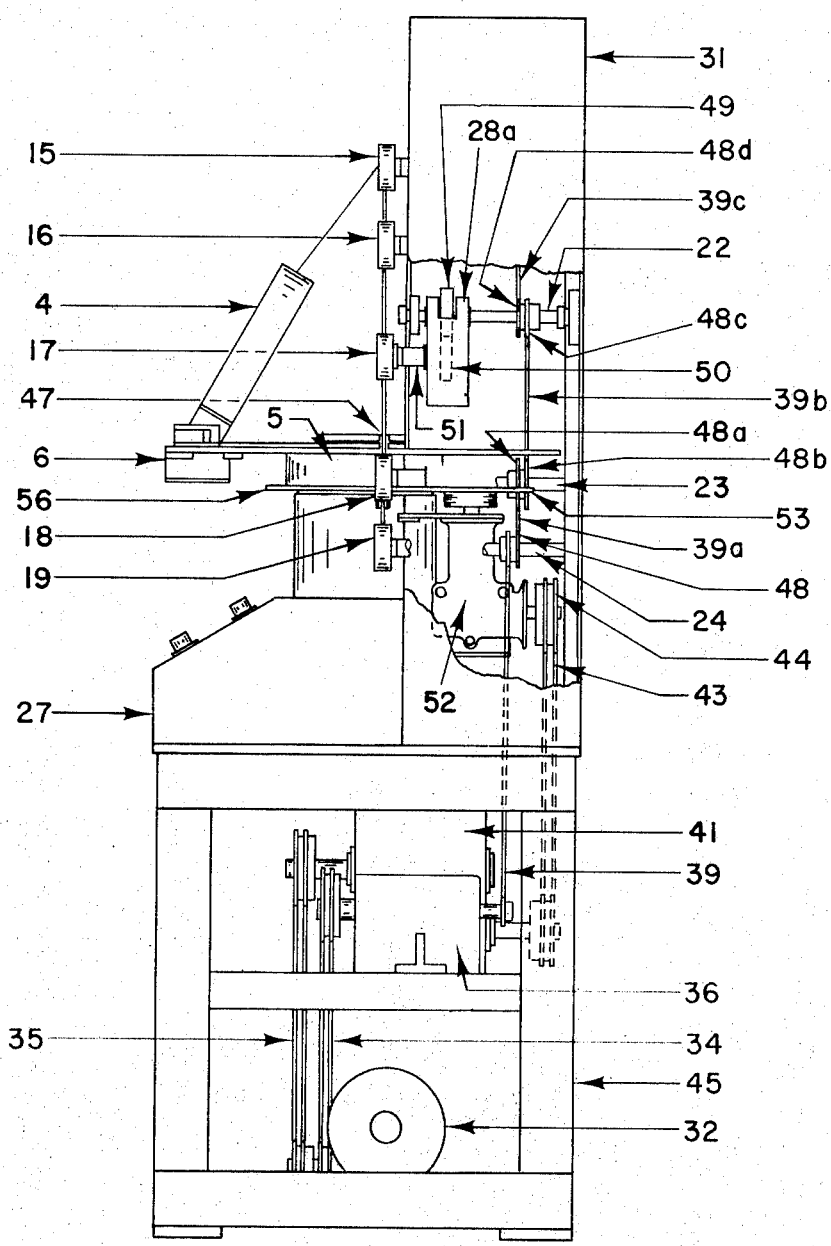
FIG. 2 is an elevation of the same apparatus viewed parallel to the plane of the bead.

FIG. 2 is an elevation of the same apparatus viewed parallel to the plane of the bead. Into base weldment 45 are mounted the gear motor 32, reversing gear box 41, and variable speed transmission 36. Chain 35 transmits power from the reversing gear box to drive the rotating platform 5. The platform contains a slot 47 for loading and unloading the bead. The reel canister 4, shown in its position furthest removed from the bead, is tipped at its maximum angle toward the core. Power is transmitted via chains 35 and 43 to sprocket 44 which in turn serves to drive the rotating platform through angle gear box assembly 52 to sprocket 53 which drives chain 54 (FIG. 3) and spocket 56. Power to the bead drive assembly is transmitted by chains 34 and 39 to sprocket 48 mounted on shaft 24 in the top weldment 31. On the same shaft is mounted a gear, not shown, which meshes with a gear on the shaft on which roller 19 is mounted. Sprocket 48 on shaft 24 and chain 39a drive sprocket 48a on shaft 23. Sprocket 48b also on shaft 23 and chain 39b drive sprocket 48c on shaft 22. Sprocket 48d on shaft 22 and chain 39c in turn drive a sprocket on shaft 21 (FIG. 1). A detail of the bead drive and clamping assembly is shown in relation to roller 17. Gear 49 on shaft 22 meshes with gear 50 shown by phantom lines on shaft 51 on which shaft roller 17 is mounted. Gear 50 and shaft 51 are mounted in housing 28a pivotally mounted on shaft 22. The operation is controlled at operator control station 27.

Figure 3:
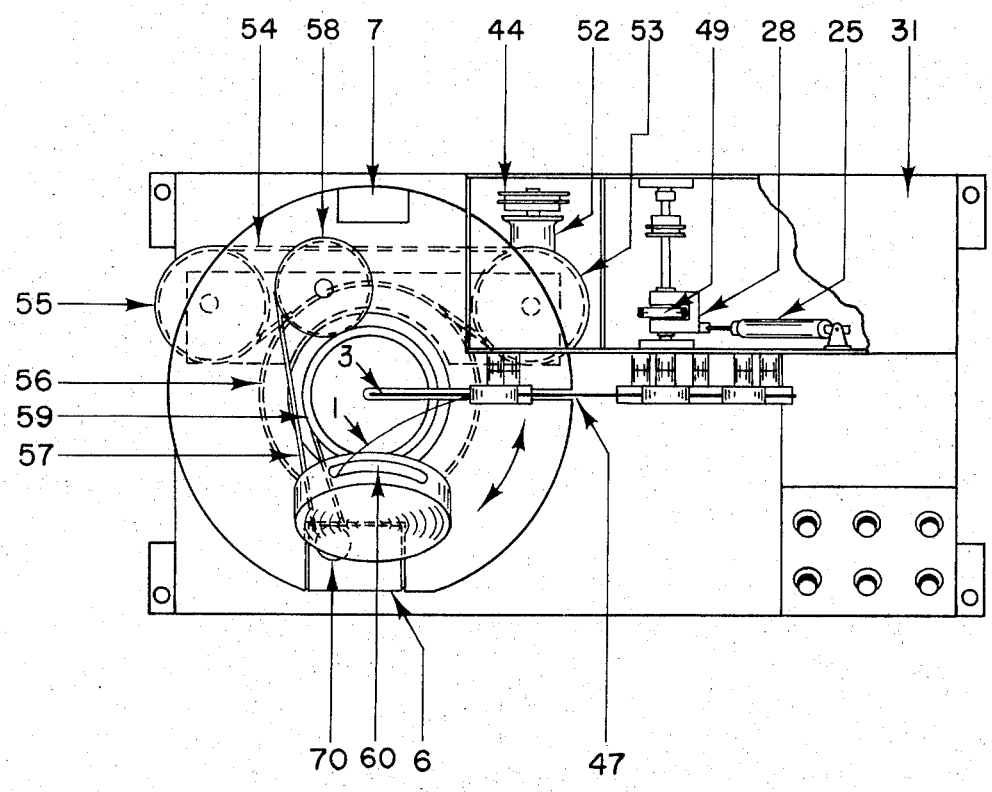
FIG. 3 is a plan view of the same apparatus showing the drive means for the rotating platform and the position of the wrap supply.

FIG. 3 is a plan view of the platform drive assembly showing drive means for rotating the platform and the strand supply supported thereon about the bead. Sprocket 44 through angle gear box 52 drives sprocket 53 and chain 54 which passes around idler sprocket 55, chain 54 thereby being maintained in contact with platform sprocket 56 driving the platform in clockwise or counterclockwise direction as desired. On the side of the platform opposite counter weight 7 is angle gear box 6 protruding from which is a shaft on which drive sprocket 70 is mounted. A chain 57 around sprocket 70 and idler sprocket 58 engages stationary sprocket 59 mounted on the platform support post 2 (FIG. 1). As the platform rotates, say in a counterclockwise direction, drive sprocket 70 must also travel a circular path with respect to the axis about which the platform rotates. The chain 57 engaging stationary sprocket 59 is thus forced to move to permit the platform to rotate in turn forcing sprocket 70 to rotate in a clockwise direction. The rotation of drive sprocket 70 is transferred through a gear train (FIGS. 4, 4a and 4b) in the angle gear box 6 to the shaft (FIG. 4b) on which the reel or canister is mounted so that the reel or canister remains in the same relative position throughout the cycle in the sense that wrap wire 1 feeds out of the canister slot 60 to the bead 3 in the same direction with respect to an axis thereof. A section of the top weldment 31 has been cut away to show a portion of the bead drive clamping assembly, including air cylinder 25, housing 28 and gear 49.

Figure 4:
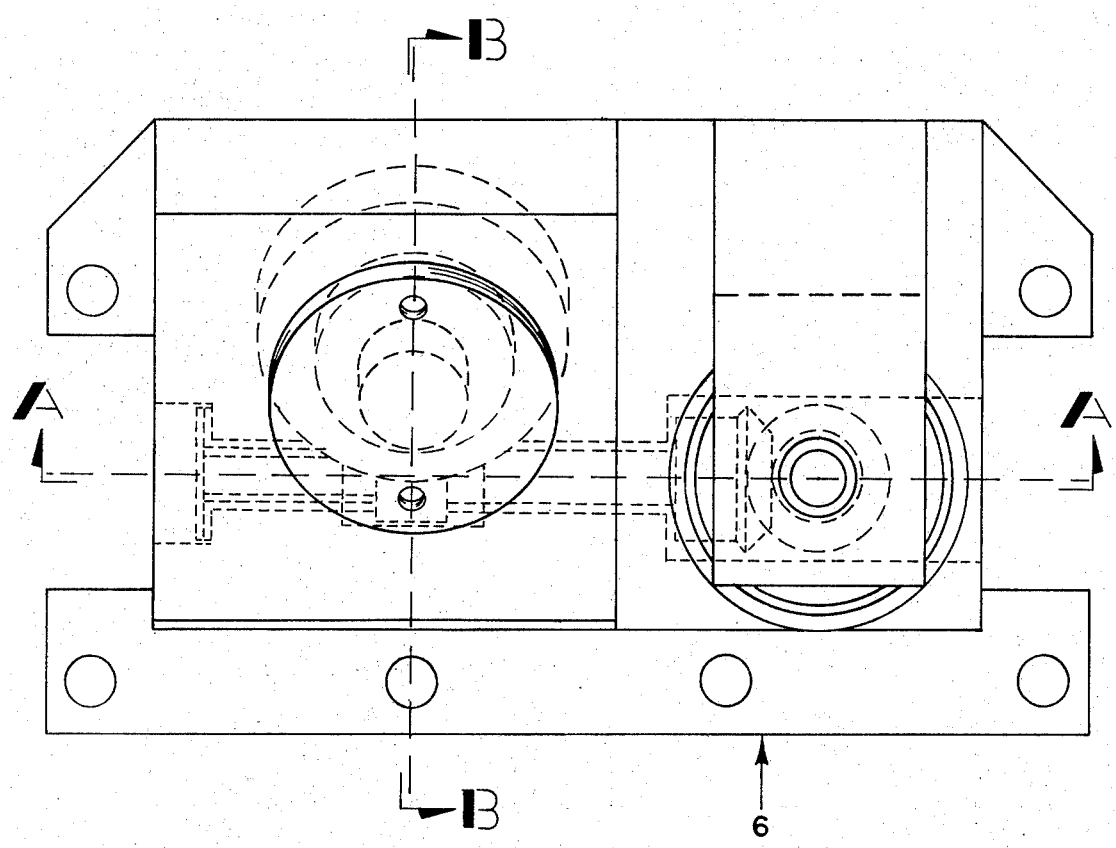
FIG. 4 is a plan view of the gear box which controls the motion of the wrap supply.
Figure 4A:
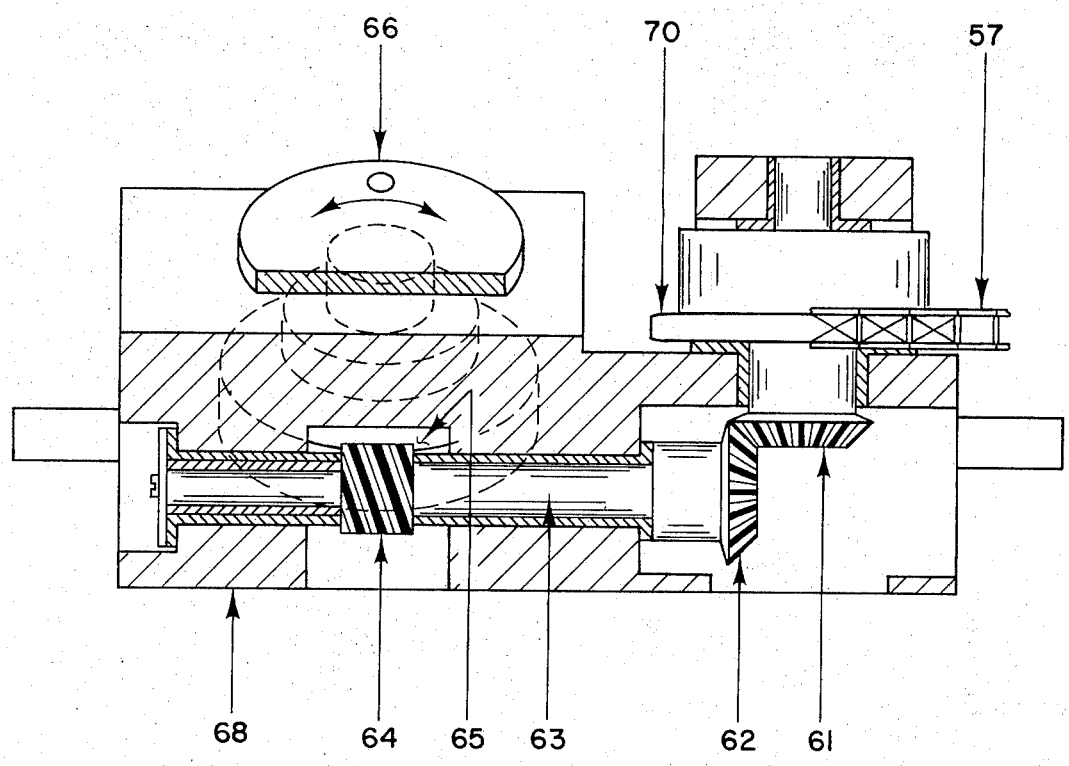
FIG. 4a is a cross section at line AA of FIG. 4 viewed in the direction of the arrows showing the arrangement of gears for driving the wrap supply and maintaining it in proper orientation.

FIG. 4 is a plan view of angle gear box 6 showing the general arrangement of the gear train which controls the motion of the reel canister. The operation of the gear train will be clearer from FIG. 4a which is section AA of FIG. 4 viewed in the direction of the arrows. Drive sprocket 70 powers bevel gear 61 which meshes with bevel gear 62 on shaft 63. On shaft 63 is also mounted helical gear 64 meshing with helical gear 65 on shaft 66 on which shaft is mounted the supply of wrap wire. This arrangement serves to maintain the reel or canister in the same orientation with respect to the cable bead in the sense that a horizontal line representing the diameter of the reel canister taken parallel to the plane of the rotating platform is always parallel with the plane of the core.

Figure 4B:
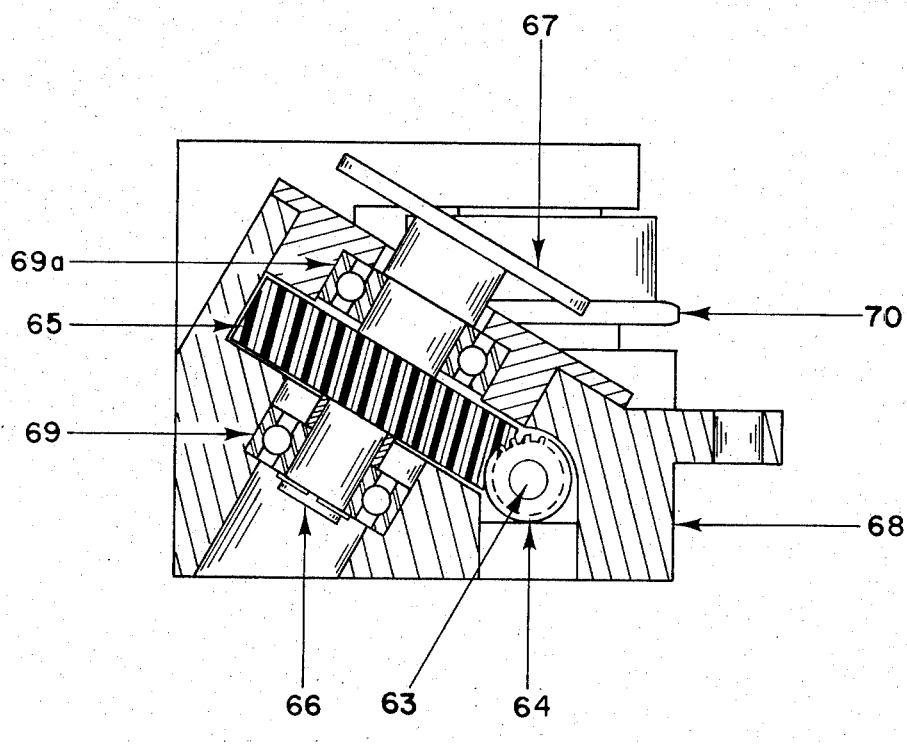
FIG. 4b is a cross section at line BB of FIG. 4 viewed in the direction of the arrows showing the detail of the wrap supply mounting.

The angular mounting for the wrap supply coil will be apparent from FIG. 4b, a cross section of FIG. 4 on line BB viewed in the direction of the arrows. The gear box body 68 is bored at an angle to receive shaft 66 terminating in mounting flange 67 integral therewith. In a typical case, the angle will be about 30° from the vertical. Shaft 66 rotates in bearings 69 and 69a. When the reel canister is inside the core and 180° therefrom, the planes of the reel canister and of the core coincide, but the reel canister will be tilted toward the core. At 90° from the aforesaid position, the bore hole in the gear box body will be directed at the same angle toward the core, but due to a 90° rotation of the reel canister, it is the plane of the reel canister which will be tilted toward the core. Due to the simultaneous rotation of the reel canister, the pitch of the plane of the reel canister to the plane of the bead varies from 0° to 30° to 0° in each half revolution of the rotatable platform.

An improved assembly for rotating the core and ensuing bead is illustrated by FIGS. 5, 6, 7 and 8.

Figure 5:
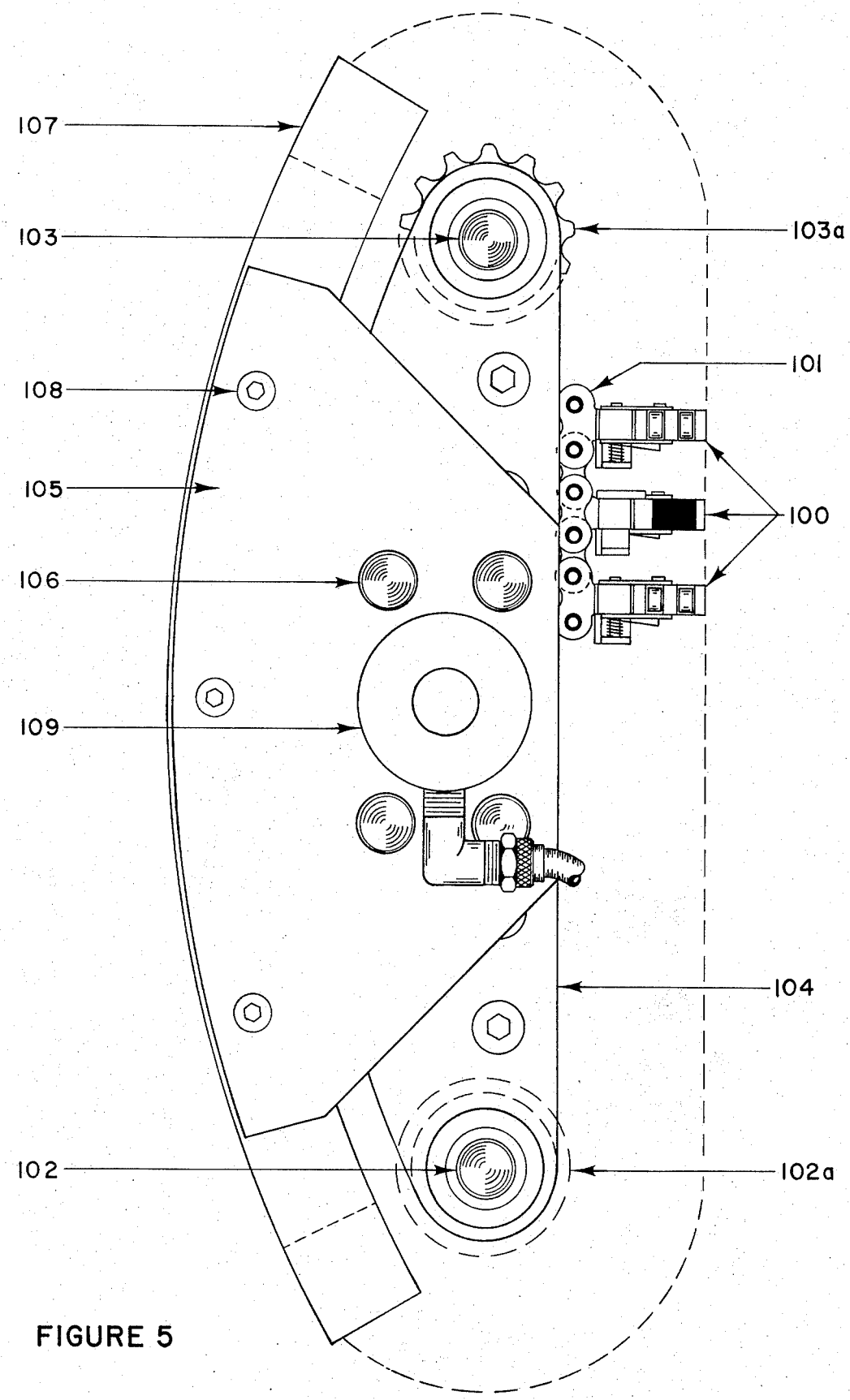
FIG. 5 is a front view (perpendicular to the plane of the bead rotation) of an improved assembly for rotating the bead.

FIG. 5 is a front view, front being considered perpendicular to the plane of the core, of a core and bead rotating assembly which clamps the core and bead by a series of grippers which exert force perpendicular to the plane of the core. A series of gripper assemblies, 100, are mouned on an endless chain 101 driven by a sprocket 102a on shaft 102. The chain passes around idler sprockets 103a mounted on shaft 103. The shafts together with the sprockets and chain which they carry are supported in a housing comprising housing plate 104 and a corresponding plate, not shown. Plate 105 is supported by four rods, 106, which pass through the housing and are secured to a back plate (FIG. 6) on which rods springs are mounted. To plate 105 is attached track plate 107 by cap screws 108. An air cylinder 109 serves to apply air pressure to relieve the spring pressure to release the bead.

Figure 6:
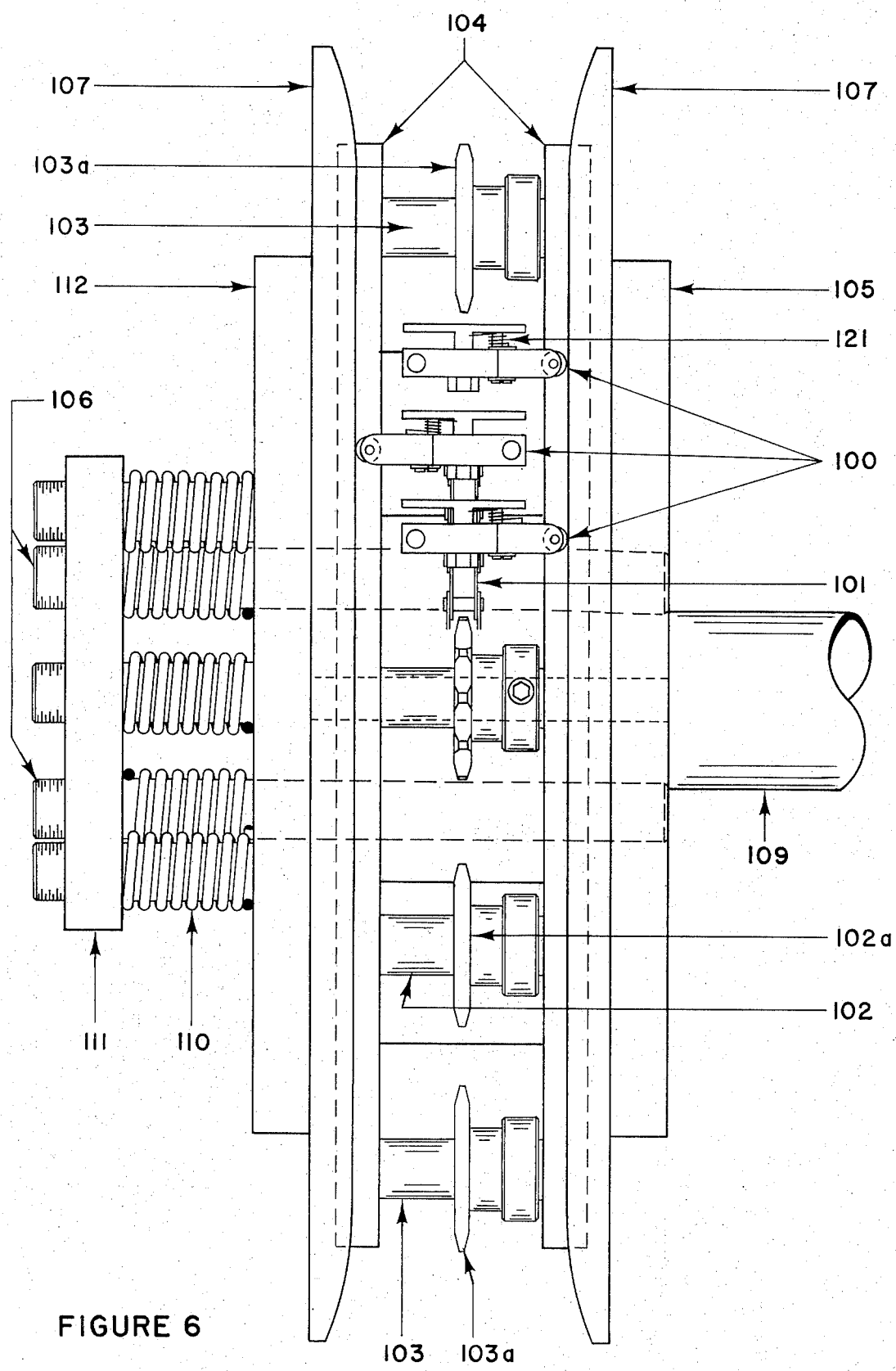
FIG. 6 is a side view of the same assembly.

Further details of the assembly are apparent from FIG. 6 which is a side view showing the alternate series of grippers 100 in disengaged position for clamping the core or bead. The staggered grippers 100 within track plates 107 are held against the bead by spring pressure exerted by a series of springs 110. The springs are between plates 111 and 112. Plate 111 is rigidly fixed by four rods 106 to plate 105. Said rods pass through plate 112 which plate floats on the rods. Secured to plate 112 and plate 105 by cap screws, not shown, are curved track plates 107. Said track plates are tapered outward at each end to receive the series of grippers and bring them to bear gradually against the bead. Track plates 107 are desirably somewhat thicker at their outer periphery but only in the tapered portion to provide a lead-in ramp.

The chain mounted staggered grippers 100 between track plates 107 are forced firmly against the bead by the aforesaid springs and drive the bead as they move through the pressure arc. When a gripper leaves the track plate area, it immediately disengages and is forced away from the bead by a small torsion spring 121 to the maximum outward position and remains in this condition until it again enters the track plate area and comes under the influence of the strong spring loading pressure. Of course, as each gripper leaves the pressure area, another enters it so that the bead remains under the pressure of substantially the same number of grippers. To remove the bead, air cylinder 109 is actuated and drives the track plates apart against the spring loading pressure. Small springs, not visible, between front fixed plate 105 and front housing plate 104 and between floating plate 112 and the rear housing plate 104 provide a self-centering system permitting the grippers to adjust to the precise position of each particular bead.

FIG. 7 is a view of a typical gripper chain assembly. A standard chain attachment 113 supports each gripper unit comprising a base block 114 (FIG. 8) secured by rivets 115 to the chain attachment 113. The base block contains three horizontal holes, one at each end and one in the middle, the end holes being adapted to receive one pin 116 (FIG. 8) of a standard chain connecting link 117. It will be appreciated that only one connecting link is secured to each base block, the position depending on which side of the bead the gripper is intended to engage but to further the interchangeability of parts, a hole is provided in each end. The other pin 116a of the connecting link engages the body of the gripper jaw 118 by means of a similar hole. The gripper jaw is therefore free to pivot through a limited arc around pin 116 of the connecting link in the base block. In the maximum closed or engaging position, the gripper jaw body rests on base block 114.

In FIG. 7, connecting link 117 is near its maximum open position, as would be the case at the end of making a cable bead. In the maximum closed position, the inner face is coincident with the center of the base block. The maximum open position, assuming no restraint by the spring loading pressure, is limited by the restraint of the base block exerted when the gripper jaw body contacts the base block in its outward motion away from the core or bead. However, during the time a gripper jaw is under the pressure of the spring loaded track plates, it is of course thereby restrained. Two hardened steel rollers or ball bearings 119 mounted in the gripper jaw body provide the contact areas between the gripper and track plate. These rollers permit the gripper jaw to move smoothly past the spring loaded track plate in spite of the strong pressure exerted thereon. A neoprene or other rubber insert 120 in the gripper jaw body contacts the bead and grips it securely.

Once the gripper jaw passes by the track plate and is no longer restrained thereby, a small torsion spring 121 forces it to its maximum outward position. One arm of the spring contains a 90° bend and is inserted in a small hole provided in pin 116a of connecting link 117. The coil of the torsion spring is supported by a stud 122 mounted on plate 125, and the plate is secured to the base block 114 by means of a screw, not shown, in the center hole thereof. The other arm of torsion spring 121 is restrained by a stud or spacing member which is part of the aforesaid plate 125. A flange or key on the bottom of plate 125 flush with the bottom of the base block extends part way across the bottom to prevent twisting of the plate with respect to the base block. Each of the series of staggered gripper jaws is of similar construction.

FIG. 8 is a side view of one of the gripper assemblies. Standard chain attachment 113 is mounted on base block body 114 secured thereto by two rivets 115 one of which is not shown. Pin 116 of standard chain connecting link 117 engages the base block 114, and pin 116a engages the body of gripper jaw 118 in which is mounted hardened steel rollers 119. Plate 125, secured to the base block by a screw, supports the coil of torsion spring 121 by stud 122 about which it is free to rotate. The arm of the torsion spring which contains a 90° bend is inserted in a small hole provided in pin 116a.

Ideally, strand is applied to the core under the natural spring tension of essentially straight strand in contrast to the aforementioned known method in which the strand is deliberately subjected to sufficient tension to cause permanent distortion which bends it to lay tightly on the core. Any permanent curvature is desirably less than the curvature of the core to which it is applied and if the available strand wire has been subjected to too much strain, it may be treated to reduce the distortion before applying it to the core. Methods for killing wire strand are well known. Moreover, the improved bead drive assembly disclosed herein permits incorporating treatment to reduce distortion in the process of applying strand. Reducing some of the strain in the process of applying strand is feasible because of the reliability of the positive drive assembly. Of course, means must be provided to restrain the strand supply in coiled form and in the case of an unshrouded or open reel, a braking means must be provided in any event to prevent unwinding of the reel due to the spring tension of the strand.

The strong pressure of the coil springs is highly concentrated at the relatively small areas of contact between the core and gripper jaws. Although the driving assembly must not only rotate the core and ensuing cable bead but must pull the strand from the supply, the powerful gripping forces assure substantially constant velocity of the core even when pulling strand from a small tensioned reel, say a 3-inch reel carrying nominal 0.06 in. diameter strand and through means to reduce curvature of the strand. Accordingly, a tensioned, small open reel may advantageously be adopted. Tensioned reels on apparatus for making grommets have been described by Beyea U.S. Pat. No. 1,570,821, Jan. 26, 1926 and by Hansen et al. U.S. Pat. No. 2,753,678, July 10, 1956. However, means for taking up slack described by Beyea is not necessary due to the herein described angular mounting and as indicated, no reel shroud is needed on a braked reel.

Another advantage of the improved core and bead driving assembly is that it allows the means selected for holding the starting end of strand against the core to pass through the unit. The gripping area adjacent to the starting end will maintain the end of strand in fixed relation to the core throughout the arc of the pressure area without interfering with or disturbing the means for keeping the end from flopping away from the core after it leaves the pressure area.

As pointed out earlier, the improvements and principles of feeding strand to the core are similar regardless of which side of the plane of rotation the coil from which strand is pulled is mounted. Thus, the relationship of coil to the angled support illustrated in FIG. 1 may be reversed and in either relationship, the canister replaced by a frictioned reel. If the reel is mounted on the angled support at the end opposite of that illustrated in FIGS. 1 and 2, it is convenient to employ a hollow support and feed strand through it, in which case a guide fixed to the support so that it maintains a further segment of the strand at the same angle as the support is advantageous but the guide must be far enough from the core to avoid putting a kink into the wire. Drawing strand through the support exerts force in opposition to the curvature of the strand coil and inherently effects some straightening of the wire. The strand will contact the entrance to the support which will act as a drag thereon easily overcome by the positive bead drive assembly. To assure smooth flow of strand into the support, it is advantageous to provide a curved entrance lip.

Although the invention has been illustrated by typical examples, it is not limited thereto. Changes and modifications of the examples of the invention herein chosen for purposes of disclosure can be made which do not constitute departure from the spirit and scope of the invention.

I claim:

1. Apparatus for forming a cable bead comprising
   means for supporting an annular bead and rotating it about its axis of symmetry,
   means for storing a coil of strand,
   means for supporting said coil and rotating it successively in a circular path about the annular bead with respect to an axis passing through the centers of cross section of said bead,
   means for maintaining substantially constant the direction of a diameter of the coil taken parallel to the plane in which the coil rotates about the annular bead, and
   means to vary during each rotation of the coil about the annular bead the angle which the axis of symmetry of the coil makes with a plane of rotation about the annular bead, cooperating with means for discharging strand from the coil to the annulr bead to provide a path through which the discharge point moves in a rotation about the annular bead shorter than the path through which the midpoint of the axis of symmetry of the coil moves.

2. Apparatus of claim 1 in which the angle formed by a line from a point on the discharge path to the midpoint of the axis of symmetry of the coil and a line from said point on the discharge path perpendicular to the plane formed by the path of the midpoint of the axis of symmetry of the coil is within the range of 15°—60 °.

3. Apparatus of claim 1 in which the means for rotating the annular bead about the axis of symmetry imparts a predetermined substantially constant velocity with respect to the axis passing through the centers of cross section of the annular bead.

4. Apparatus for forming a cable bead comprising
   means for supporting an annular bead,
   means for gripping said bead including grips to exert opposing pressures from opposite sides of the plane of symmetry of the bead, in which is contained the entire circumferential axis passing through its centers of cross section,
   means for moving the grips on an endless path into and out of engagement with the annular bead to rotate the annular bead about its axis of symmetry, and
   means for rotating a supply of strand about the rotating annular bead with respect to an axis passing through the centers of cross section of said bead.

5. Apparatus of claim 4 in which the means for gripping the bead comprise movable grips staggered to exert pressure at alternate areas on opposite sides of the bead surface.

6. Apparatus for forming a cable bead comprising
   means for supporting an annular bead,
   means for rotating said annular bead about its axis of symmetry,
   means for storing a coil of strand,
   means for supporting said coil comprising a first supporting element for rotating it successively about the annular bead with respect to an axis passing through the centers of cross section of said bead, and a second supporting element for rotating the coil about its own axis to compensate for its rotation about the annular bead set at an angle from the vertical in the direction of a radius of the plane of rotation about the annular bead so that the angle between the perpendicular to the plane of rotation and the angled second supporting element is within the range of 15°–60°,
   and
   means for feeding strand to the annular bead at the angle determined by the said second supporting element.

7. Apparatus of claim 6 in which the means for rotating the annular bead about its axis of symmetry comprises
   means for gripping said bead including grips to exert opposing pressures on opposite sides of its plane of symmetry, in which is contained the entire circumferential axis passing through its centers of cross section, and
   means for moving the grips to rotate the bead.

8. Method of forming a cable bead which comprises
   supporting an annular bead and rotating it about its axis of symmetry,
   feeding strand to the rotating bead from a coiled supply thereof while rotating said coiled supply in a circular path about the annular bead with respect to an axis passing through its centers of cross section,
   maintaining substantially constant the direction of a diameter of the supply coil taken parallel to the plane in which the supply coil rotates about the annular bead, and
   varying during each rotation of the coil about the annular bead the angle which the axis of the coiled supply makes with the plane of rotation about the bead to provide a path through which the discharge point of strand moves in a rotation about the bead shorter than the path through which the midpoint of the axis of symmetry of the coiled supply moves.

9. In a method of forming a cable bead which comprises
   rotating an annular core about its axis of symmetry and,
   feeding strand about the rotating annular core to form a bead,
   the improvement which comprises rotating the annular core by series of grips which exert opposing pressures on a segment of the core from opposite sides of the plane of symmetry of the core in which is contained the entire circumferential axis passing through the centers of cross section of the core.

* * * * *